Nov. 28, 1939.   G. B. WARREN   2,181,752

ELASTIC FLUID TURBINE

Filed Sept. 2, 1938

Inventor:
Glenn B. Warren,
by Harry E. Dunham
His Attorney.

Patented Nov. 28, 1939

2,181,752

UNITED STATES PATENT OFFICE

2,181,752
ELASTIC FLUID TURBINE

Glenn B. Warren, Niskayuna, N. Y., assignor to General Electric Company, a corporation of New York Application September 2, 1938, Serial No. 228,162

6 Claims. (Cl. 253—76)

The present invention relates to elastic fluid turbines and more particularly to arrangements for collecting liquid of condensation from the elastic fluid passing through a conduit extending from a high pressure to a low pressure turbine.

Elastic fluid, after passing through a turbine section and performing work therein, usually contains a certain quantity of condensate in the form of liquid particles entrained therein. Before supplying such fluid to a lower pressure turbine it is desirable to remove such particles of condensation from the elastic fluid. This may be accomplished by mechanical liquid vapor separating devices or the fluid exhausted from the high pressure turbine may be reheated and the liquid particles contained therein thereby reconverted into vapor.

It is an object of my invention to provide a new and improved arrangement for mechanically removing liquid particles admixed with the elastic fluid discharged from a high pressure turbine and to be conducted to a low pressure turbine or like elastic fluid consumer.

For a consideration of what I believe to be novel and my invention, attention is directed to the following description and the claims appended thereto taken in connection with the accompanying drawing.

Figure 1:
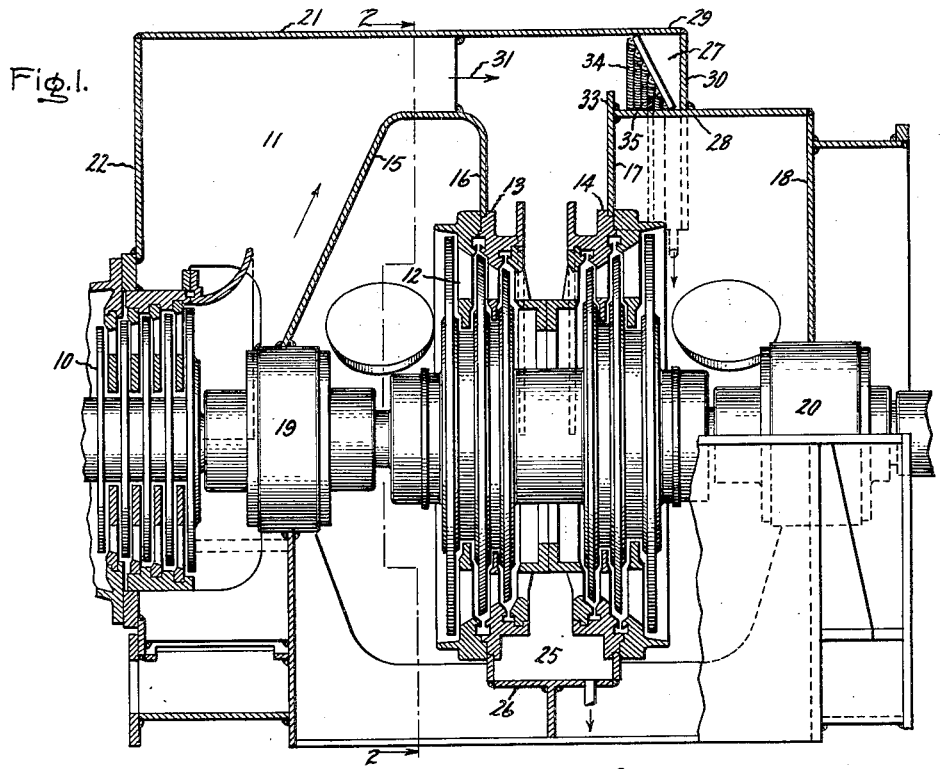
Figure 2:
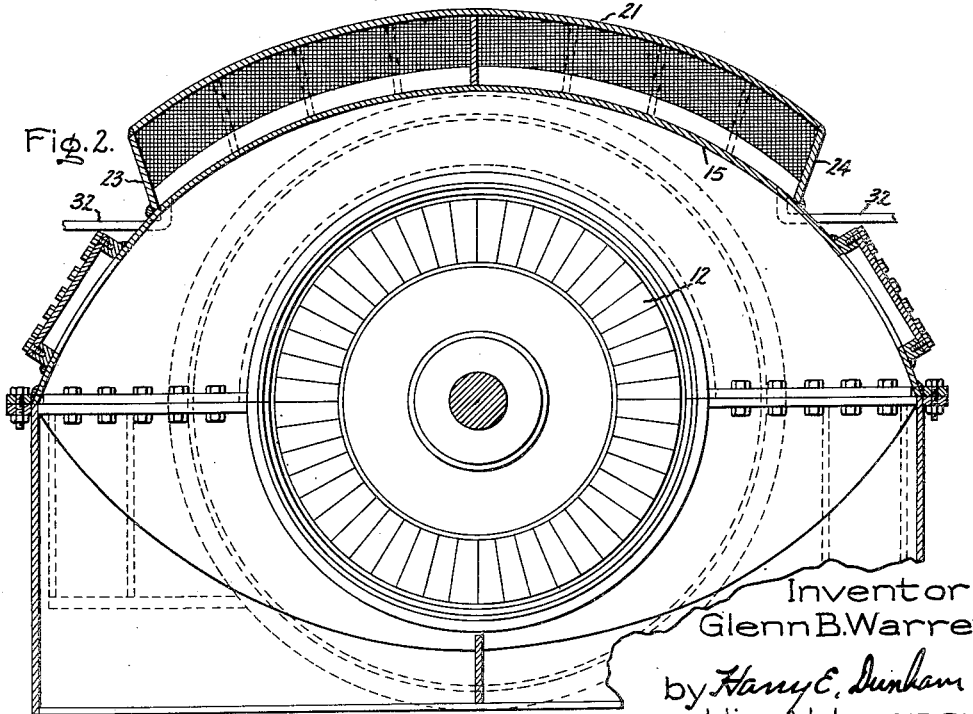

In the drawing, Fig. 1 illustrates a sectional view of an elastic fluid turbine arrangement embodying my invention, and Fig. 2 is a sectional view along the line 2—2 in Fig. 1.

Referring to the drawing, the arrangement comprises a high pressure turbine or turbine part 10, the last stage of which is connected by a crossover conduit 11 to a double-flow low pressure turbine, or turbine part 12. The latter turbine has two casing parts 13 and 14 and a fabricated exhaust casing including walls 15, 16, 17 and 18. The two turbine rotors are mounted upon a single shaft supported by bearings 19 and 20 which in turn are mounted within the walls 15 and 18. The casing wall 15 also forms a partition between the exhaust space of the high pressure turbine 10 and the exhaust space of the low pressure double-flow turbine 12. The walls 15, 21, 22, 23 and 24 define the crossover conduit 11 which communicates with an annular inlet channel 25 defined by the walls 16, 17 and 26, through which the elastic fluid is admitted to the double-flow turbine section. Further constructional details of this particular turbine design may be found in the patent to Oscar Junggren No. 2,102,416, issued December 14, 1937 and assigned to the General Electric Company, the assignee of the present invention.

The end of the crossover conduit 11, at the right as viewed in Fig. 1, extends beyond the opening of the channel 25 forming a chamber 27 defined by a portion 28 of the exhaust casing of the low pressure turbine, a continuation 29 of the conduit wall 21 and an end wall 30. The cross-section or the inlet opening of the chamber 27 is substantially of the same dimensions as the cross-section or outlet opening of the crossover conduit 11. It will also be noted that the annular channel 25 is arranged substantially at right angles with respect to the outlet of the crossover conduit so that the operating fluid is forced to make a relatively sharp turn in passing from the crossover conduit into the channel 25. The elastic fluid emerging from the high pressure turbine and flowing through the conduit 11 travels at a relatively high velocity in the direction indicated by the arrow 31 toward the end wall 30. The liquid particles entrained in the fluid, due to their greater inertia, will be carried across the opening communicating with the channel 25 and projected into the chamber. The liquid is collected therein and drained therefrom through the connections 32 communicating with the chamber at its lowermost portions on each side. The connections 32 preferably communicate with a consumer, such as a preheater (not shown), in which the heat energy contained in the liquid may be utilized. A portion 33 of the wall 17 extends slightly above the portion 28 to prevent the liquid from draining into the channel 25. The arrangement described, including the liquid collecting chamber 27 is set forth and claimed in my copending application, Serial No. 192,826, filed February 26, 1938, and assigned to the General Electric Company, the assignee of the present invention.

The present invention is in the nature of an improvement over the construction of the above copending application and comprises the provision of a screen 34 within the liquid collecting chamber 27 between the inlet thereto and the rear wall 30. The screen substantially closes off the rear portion of the chamber 27 in which the elastic fluid will be relatively stagnant during the operation of the machine. The liquid particles not collected on the screen will be projected therethrough and precipitate in the rear of the chamber. Because of the protection afforded by the screen, the liquid will not be subjected to strong eddy currents of the elastic fluid and carried from the chamber downwardly into the channel 25 and the low pressure turbine. The size of the chamber 27 may thus be considerably reduced, since heretofore the chamber was required to be relatively large to minimize the effect of the elastic fluid eddy currents. A perforated plate, or any other suitable pervious member, may be substituted for the screen 34 as desired. It is preferred that the screen be secured in an angular position with the lower edge considerably spaced from the forward wall portion 33 so that a maximum of screen area will be presented to the path of the liquid particles. The condensate collected upon the screen will be drained to the rear portion of the chamber 27 where there will be little likelihood of it being scooped out of the chamber by the elastic fluid eddy currents. A relatively low dam 35 may be placed just in front of the lower edge of the screen 34 to confine the collected liquid to the rear portion of the chamber 27 until it is drained therefrom through the connections 32.

Having described the principle of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination with a conduit for conducting elastic fluid from a high pressure turbine to a low pressure turbine, a chamber having a cross section substantially of the same dimensions as the cross section of said conduit, the inlet of said chamber being so arranged with respect to a portion of said conduit that the particles of liquid entrained in the elastic fluid flowing through said conduit will be projected into said chamber, a screen arranged across said chamber spaced forwardly from the rear wall thereof to protect the precipitating liquid collected in said chamber from strong elastic fluid currents.

2. The combination with a conduit for conducting elastic fluid exhausted from a high pressure turbine to the inlet of a low pressure turbine, a chamber having an inlet in substantially perpendicular alignment with a portion of said conduit whereby the particles of condensation contained in the elastic fluid flow through said conduit are projected from said flow and into said chamber, and a member pervious to said particles extending across the inlet of said chamber.

3. An elastic fluid turbine arrangement comprising a high pressure turbine part, a low pressure turbine part, a crossover conduit for conducting exhaust fluid from the high pressure turbine part to the low pressure turbine part, a chamber having an inlet facing the elastic fluid flow through said conduit so arranged that the particles of condensation entrained in said flow are projected into said chamber, a pervious member extending across said chamber forming a substantial enclosure in said chamber behind said member.

4. The combination with a casing for an elastic fluid turbine having a high pressure section and a low pressure section, a passage defined by spaced apart walls of said casing for conducting elastic fluid from the exhaust of said high pressure section to the inlet of said low pressure section, a relatively sharp turn in said passage, a chamber in said casing adjacent said turn so that particles of condensate entrained in the fluid flow are projected therefrom into said chamber, and means arranged in said chamber for substantially precluding currents of elastic fluid from sweeping out of said chamber the condensate collected therein.

5. The combination with a casing for an elastic fluid turbine having a high pressure section and a low pressure section, a passage defined by spaced apart walls of said casing for conducting elastic fluid from the exhaust of said high pressure section to the inlet of said low pressure section, the inlet to said low pressure section being substantially at right angles to the adjacent end of said passage, a chamber formed in said casing on the opposite side of said inlet with respect to said passage, the opening to said chamber facing said passage and being in substantial alignment with respect thereto, and a screen arranged within said chamber forming a region to the rear of said screen substantially protected from strong currents of elastic fluid flow for the accumulation of condensate particles projected through said screen from said passage.

6. An elastic fluid turbine arrangement comprising a high pressure section, a low pressure section, a casing for said turbine, a conduit defined by spaced apart walls of said casing for conducting elastic fluid from said high pressure section to said low pressure section, the inlet to said low pressure section being at substantially right angles with respect to said conduit, a chamber for collecting condensate particles arranged adjacent said inlet and oppositely disposed with respect to the end of said conduit and in alignment therewith, the opening to said chamber facing said conduit and having a cross-sectional area substantially equal to the cross-section of said passage, and a screen arranged across the opening of said chamber for lessening the force of elastic fluid currents therebehind.

GLENN B. WARREN.